Dec. 18, 1973  E. H. DOMECKI  3,780,196
METHOD OF PACKING SHRIMP
Filed Feb. 29, 1972
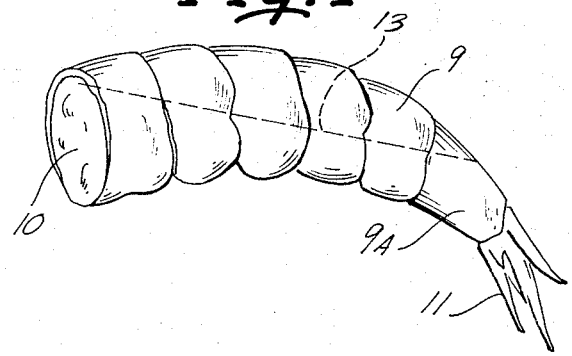
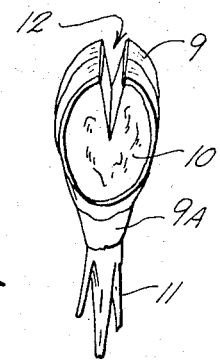
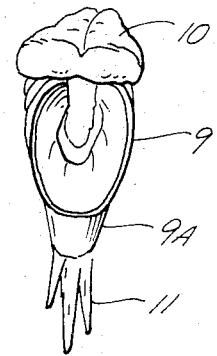
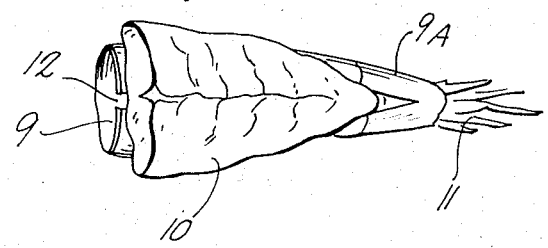
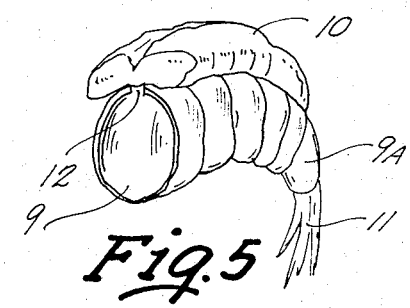
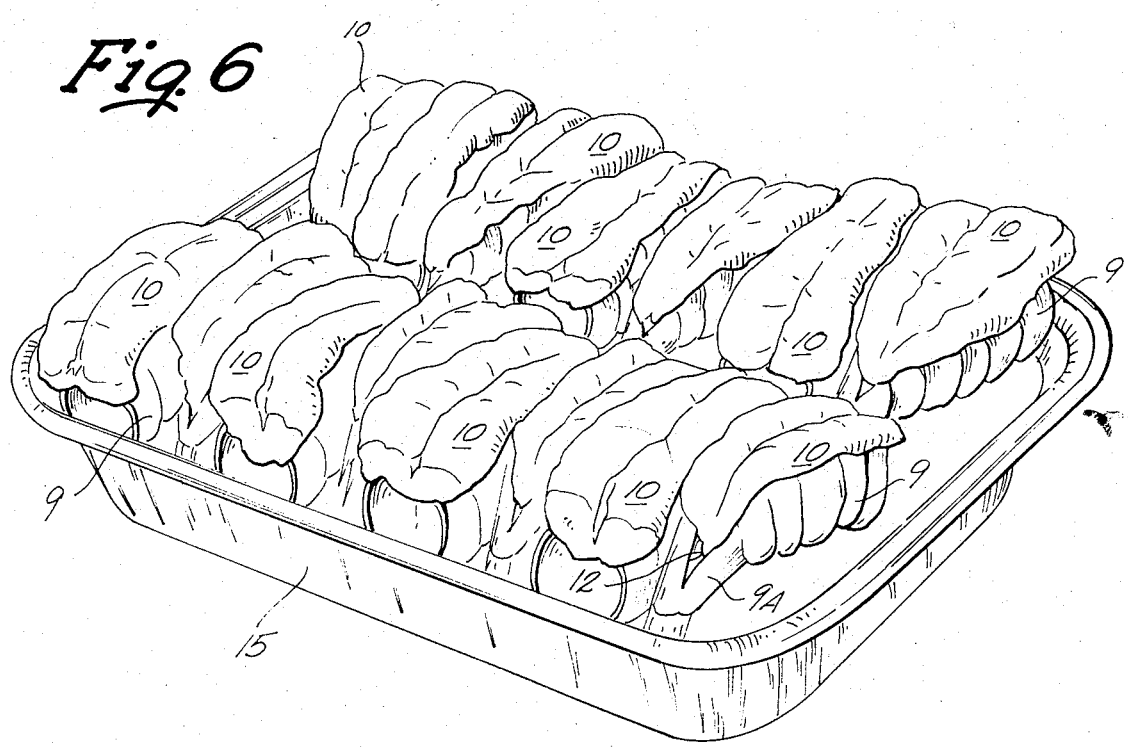

United States Patent Office 3,780,196
Patented Dec. 18, 1973

3,780,196
METHOD OF PACKING SHRIMP
Edward H. Domecki, 2140 NE. 30th St.,
Lighthouse Point, Fla. 33064
Filed Feb. 29, 1972, Ser. No. 230,385
Int. Cl. A22c 29/00; B65b 25/22
U.S. Cl. 426—393                 6 Claims

ABSTRACT OF THE DISCLOSURE

The shrimp is decapitated and the shell covering its body is severed longitudinally along its dorsal side with the cut extending through the first five segments and partially through the sixth segment, leaving the telson intact. The meat of the shrimp is then lifted from the shell but is left attached to the end portions of the sixth segment and the telson. The vein and roe are completely removed and the meat is placed on top of the shell. It is packed in an aluminum tray with the meat resting on the shell, wrapped and then frozen.

BACKGROUND OF THE INVENTION

The prevent invention pertains to the packaging of crustaceans belonging to the order Decapoda and is particularly suitable for use in marketing shrimp and especially the *Sicyonia brevirostris* more commonly known as the rock shrimp.

Although the present invention is applicable in whole or in part to the packaging of a large variety of crustaceans it was conceived during the development of processes suitable for marketing the *Sicyonia brevirostris* which is commonly known as the rock shrimp.

The shell of the rock shrimp is much heavier and harder than the shell of the shrimp which are presently popular as a food such as the Crago and allied genera. Although the rock shrimp is a member of the shrimp family and has the appearance of the shrimp, its meat is of a different texture and has a different flavor.

The meat of the average rock shrimp is not as large as the average shrimp which is presently popular as a food. If it is completely removed from the shell it has an unappetizing appearance. On the other hand, if it is left in the shell during the cooking process it absorbs a flavor from the shell which definitely detracts from its savor.

It is therefore a general object of the present invention to provide an improved method of packing shrimp which will increase their desirability as a food item in all respects.

It is an object of the present invention to provide an improved method of packing shrimp so that the finished product becomes a gourmet item.

It is a further object of the present invention to provide a method of packing shrimp which renders the shrimp more appetizing not only in taste but in appearance as well and which greatly facilitates the cooking of the shrimp.

SUMMARY OF THE INVENTION

According to the present invention, the shrimp is decapitated and the shell covering its body is severed longitudinally along its dorsal side from its front end to approximately the sixth segment, leaving the telson intact. This cut along the dorsal side will remove most of the vein and roe, but the shrimp is cleaned to remove any traces which may remain. The meat is lifted out of the shell without detaching its from the sixth segment and the telson and is set on the shell. This leaves the meat resting on top of the holow shell but still attached to the shell at the sixth segment and the telson.

The removal of the meat from the shell and the cleaning away of the vein and roe greatly improves the taste of the cooked shrimp. The cut into the back of the meat flattens it out on top of the shell and the fact that it is supported on top of the shell while remaining attached thereto preserves it shape by preventing it from curling and shriveling.

The shrimp is then packed in a heat proof tray which is preferably disposable. An aluminum foil tray is ideal for this purpose. The unit is then wrapped in suitable material, such as transparent plastic and frozen. The consumer need only remove the wrapping and place the heat proof tray with the shrimp in the oven to cook it for gourmet dining.

BRIEF DESCRIPTION OF THE DRAWING

FIG. 1 is a side view of a shrimp which has been cut along its dorsal side, a broken line depicting the depth of the cut;

FIG. 2 is an end view of a shrimp which has been cut along its dorsal side;

FIG. 3 is another end view of the shrimp shown in FIG. 3, but with the meat lifted from the shell and resting on top of the shell;

FIG. 4 is a top view of the shrimp shown in FIG. 3 illustrating the meat of the shrimp resting on top of its shell while remaining attached to the shell at its sixth segment and its telson;

FIG. 5 is a perspective view of the shrimp shown in FIGS. 3 and 4; and

FIG. 6 is a perspective view of a plurality of shrimp prepared as illustrated in FIG. 5 and packed in an aluminum tray ready to be cooked.

Reference is now made more particularly to the drawings which illustrate a shrimp that is processed in accordance with the present invention. Since the first step in processing shrimp is to remove the head, the shrimp illustrated in the drawings is shown with its head removed. The shrimp comprises a shell 9 which encloses the meat 10 of the shrimp. The shell 9 is formed of six segments with the first segment being disposed adjacent to the head (not shown) of the shrimp and the sixth segment being the last of the shell and is identified by the reference numeral 9A in FIG. 1. Extending rearwardly from the sixth segment 9A is telson 11.

After the shrimp has been decapitated, the first step in the process is to form a cut 12 along the dorsal side of the shrimp as best illustrated in FIG. 2. The cut 12 extends to a depth represented by the broken line 13 in FIG. 1, cutting through the first five segments of the shell 9 and approximately one half of the sixth segment 9A. Thus, the rearmost portion of the sixth segment 9A is not severed by the cut 12 and the telson 11 is left intact.

After the longitudinal cut 12 has been made, the meat 10 is separated from the first five segments of the shell 9 and is lifted out of the shell without detaching the meat from the sixth segment 9A and the telson 11. The meat 10 thus lifted out of the shell is placed upon the shell 9 to rest upon its dorsal surface covering the cut 12 which was previously made in the shell 9. The meat 10 is then supported on top of the shell 9 in the manner illustrated in FIGS. 3, 4 and 5.

When forming the cut 12 along the dorsal side of the shrimp, the cut is extended into the meat 10. As a result, when the meat is rested upon the top of the shell 9 it flattens out and does not retain its circular configuration in cross section. On the other hand, the shell 9 retains substantially its original shape but is now hollow instead of filled with the meat 10.

The cut along the dorsal side of the shrimp will remove most of the vein and roe. However, at this point it is preferred that the meat 10 be washed into insure that all traces of the vein and roe are removed.

The shrimp as illustrated in FIG. 5 is then packed in a heat proof tray 15 such as a tray fabricated of aluminum foil which may be disposed of when the shrimp are consumed. For more efficient packing the alternate shrimp are faced in opposite directions so that the tail of one extends in one direction and the next shrimp in the tray has its tail facing in the opposite direction.

After the desired number of shrimp are placed in the tray 15, the entire tray and its contents are wrapped in a suitable wrapping material such as a transparent plastic sheet material. The package is then frozen and is ready for the market. The ultimate consumer merely removes the wrapping material from the package and places the tray with the shrimp in it in an oven for cooking the shrimp to produce a gourmet food item. The shrimp is preferably served on the shell and the diner detaches the meat from each shell to eat it.

It has been found that if the meat 10 is entirely removed from the shell 9 and is frozen, the meat tends to curl and shrivel when being cooked resulting in an unappetizing appearance. This tendency to curl and shrivel is eliminated by the improved process of the present invention, by supporting the meat 10 on top of the shell 9 during the cooking process without completely detaching the meat 10 from the shell.

In an effort to prevent the curling and shriveling of the meat 10 when it is cooked, the meat 10 has been allowed to remain in the shell 9 during the cooking process. It has been found that this seriously detracts from the flavor of the meat since it absorbs some flavor from the shell 9 and the vein and roe which are disposed along the dorsal side of the shrimp also impart a flavor to the shrimp during the cooking process which is distasteful and detracts from the tastiness of the cooked shrimp as a food item. By placing the meat 10 upon the top of the shell 9, the meat does not absorb any flavor from the shell 9 during the cooking process and the vein and roe will have been completely removed from the meat 10 as mentioned above, so that they cannot impart an undesirable flavor to the meat.

Moreover, it has also been found that the hollow shell 9 can be stuffed with a variety of food items, at the discretion of the cook, which will impart a very desirable flavor to the meat 10 to greatly enhance its flavor and thus create a gourmet food item.

From the foregoing detailed description of the present invention, it will be readily understood that an improved method has been provided for processing shrimp which produces a very desirable appearance of the shrimp when marketed and further greatly enhances the final flavor of the cooked shrimp while facilitating the cooking process for the ultimate consumer.

Although the illustrative embodiment of the present invention has been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of the illustrative embodiment, the invention is hereby claimed as follows:

1. The method of packing shrimp comprising; decapitating the shrimp, cutting through the shell of the shrimp along most of the length of the shrimp such that a portion of the meat remains attached to the shell, lifting the meat out of the shell through said cut and resting the meat on top of the shell, said portion of meat being still attached to the shell and packaging the shrimp with the meat resting on the shell so that it can be cooked while being supported by the shell.

2. The method of packing shrimp according to claim 1 wherein said packaging step includes packing the shrimp in a heat proof tray so that the ultimate consumer can cook the shrimp in said tray, wrapping the shrimp and tray in a wrapping material, and freezing the entire package.

3. The method of packing shrimp according to claim 1 wherein the meat is fully separated from the first five segments of the shell but remains attached to the sixth segment while it is being supported by the shell.

4. The method of packing shrimp according to claim 3 wherein said cutting step includes cutting through the shell along the dorsal side of the shrimp through the first five segments and partially through the sixth segment and lifting the meat out of the shell through said cut without fully separating the meat from the sixth segment and from the telson of the shrimp.

5. The method of packing shrimp according to claim 1 wherein said cutting step includes cutting through the shell along the dorsal side of the shrimp through the first five segments and partially through the sixth segment.

6. The method of packing shrimp according to claim 5 wherein said packaging step includes packing the shrimp in a heat proof tray so that the ultimate consumer can cook the shrimp in said tray, wrapping the shrimp and tray in a wrapping material, and freezing the entire package.

References Cited
UNITED STATES PATENTS

| | | | |
|---|---|---|---|
| 3,152,915 | 10/1964 | Cover et al. | 99—111 X |
| 1,906,375 | 5/1933 | Grande | 99—188 |
| 3,423,788 | 1/1969 | Lapeyre | 17—71 |

OTHER REFERENCES

Womans Day Encyclopedia of Cookery, 1966, vol. 10, Fawcett Publications Inc., N.Y. p. 1660.

Modern Packaging, March 1956, pp. 190, 191.

FRANK W. LUTTER, Primary Examiner

S. L. WEINSTEIN, Assistant Examiner

U.S. Cl. X.R.

17—71; 426—414